United States Patent [19]

Zachary

[11] Patent Number: 4,957,467
[45] Date of Patent: Sep. 18, 1990

[54] DEVICE FOR PRIMARY SEPARATION OF GRAIN IN A COMBINE HARVESTER FOR CEREALS

[76] Inventor: Alain Zachary, Voncq, 08400 Vouziers, France

[21] Appl. No.: 413,582

[22] Filed: Sep. 28, 1989

[30] Foreign Application Priority Data

Oct. 14, 1988 [FR] France .................. 88 13588

[51] Int. Cl.$^5$ .......................................... A01F 12/20
[52] U.S. Cl. ......................................... 460/69; 460/81; 460/84
[58] Field of Search ........................ 460/69, 42, 44, 46, 460/68, 70, 71, 81, 84, 141, 902, 903; 56/DIG. 19, DIG. 20

[56] References Cited

U.S. PATENT DOCUMENTS

| 771,368 | 10/1904 | Jakob | 460/81 |
|---|---|---|---|
| 1,907,344 | 5/1933 | Climer | |
| 3,995,645 | 12/1976 | Rowland-Hill | 460/68 |

FOREIGN PATENT DOCUMENTS

| 1006384 | 4/1952 | France |
| 2030564 | 11/1970 | France |
| 2382847 | 10/1978 | France |

Primary Examiner—Bruce M. Kisliuk
Assistant Examiner—Terry Lee Melius
Attorney, Agent, or Firm—Hoffman, Wasson, Fallow & Gitler

[57] ABSTRACT

A device for primary separation of grain and straw in a combine harvester for cereals, the combine comprising a chassis and wheels and, going from the front towards the rear relative to the longitudinal direction of combine displacement:
a mower;
a mown crop conveyor;
a thresher; and
a rotary drum separator;
the separator further comprises:
a rotary cylindrical drum disposed substantially horizontally in the longitudinal direction of the combine harvester and having an inlet orifice facing the thresher and an outlet orifice at the rear of the combine harvester;
the drum comprising a cylindrical wall pierced by multiple perforations for passing grain, at least one internal rib fixed to the cylindrical wall and forming a helix at a first predetermined pitch extending over the entire length of the drum and a plurality of elongate drive members fixed around the drum and extending inwards, and disposed both longitudinally and circumferentially relative to the drum in such a manner as to form a set of successive portions of a substantially helical surface having a second pitch which is several times greater than the first pitch.

8 Claims, 3 Drawing Sheets

DEVICE FOR PRIMARY SEPARATION OF GRAIN IN A COMBINE HARVESTER FOR CEREALS

BACKGROUND OF THE INVENTION

The present invention relates to a combine harvester for cereals, and relates more particularly to a device for primary separation of the grain from the straw, stalks, or other wastes, after they have been through the threshing device.

In most machines that are commercially available at present, the grains are separated from the straw downstream from the threshing device by means of perforated oscillating shakers over which the threshed grain and straw move rearwards relative to the longitudinal direction of the machine with the grains falling progressively through the straw down to the perforated plates at the bottoms of the shakers, through which they pass to be taken up in devices for final separation from small pieces of straw and other dust, e.g. by blowing away the chaff.

For economic reasons, these machines are becoming larger and larger in size and more and more powerful in order to process larger volumes of cereals in as short a time as possible.

However, when the machine is travelling over sloping ground, the effectiveness of the shakers is reduced. It is also observed that the bed of straw moving over the shakers sometimes becomes several tens of centimeters thick such that grains fall relatively slowly through such a thickness and the shakers need to be extended considerably.

Other solutions have also been developed, likewise based on vibrating trays or the like, generally by increasing the number of threshing stages, but consequently also increasing the complexity and the cost of the machine, as well as the power it consumes, not to mention the danger of the machine becoming completely jammed when the straw clogs the threshing stages, which sometimes happens under certain harvesting conditions.

Another solution, illustrated in French patents 1 006 384, 2 030 564 and 2,382,847, and U.S. Pat. No. 1,907,344 consists in causing the grain-and-straw mixture to circulate after threshing in a rotating drum having a perforated wall and extending along the longitudinal axis of the machine.

The advantage of this solution is that it makes this separation stage insensitive to slope transverse to the direction of travel of the machine across sloping ground.

In the separator disclosed in FR patent 1 006 384 the crop material advances under gravity, thanks to an adequate slanting of the drum axis.

The grain and straw mixture is entrained by a helical rib disposed around the inside periphery of the drum. However, this gives rise to relatively slow drive and this type of solution has not been developed in practice since the size of drum needed would be excessive, and/or since it would be necessary to add complementary driving means, such as a blower as disclosed in this document.

The separator disclosed in FR patent 2 382 847, comprises, in addition to a helical rib attached to the inner periphery of the drum, a mechanism extending along the axis of the drum and provided with reciprocating arms intended to drive longitudinally the crop materials. This mechanism is however complex, expensive and fragile.

In the separator disclosed in U.S. Pat. No. 1,907,344, the inner face of the drum carries a great number of inwardly and rearwardly extending rods. Due to this great number, the whole set of rods actually forms a generally cylindrical surface having a shallow helicoidal relief having a very low pitch.

The crop materials are not efficiently driven and it is necessary to add a complementary blowing means in order to correctly drive the crop material. Further, the grains, chaff and other small size particles are virtually not driven along the drum.

SUMMARY OF THE INVENTION

It is the object of the invention to provide a simple and efficient separator which obviates the drawbacks of the various prior art devices.

According to the invention, in a combine harvester-thresher for cereals, which comprises a chassis and ground engaging wheels, the combine having a front end and a rear end relative to its direction of displacement, and further comprising, from its front end to its rear end:

a mower means,
a mown crop conveyor means;
a thresher means, and
a rotary drum grain separator;

said separator comprising: a cylindrical drum having an axis extending substantially horizontally and longitudinally with respect to the chassis and rotatably mounted about said axis, the drum having an inlet orifice facing said thresher means and an outlet orifice opening at the rear end of the combine, the drum comprising a cylindrical wall provided with a plurality of perforations adapted for the passage of grain therethrough, at least one internally protruding rib fixed to the cylindrical wall and forming an helix at a first predetermined pitch extending over the entire length of the drum, the improvement whereby said drum further comprises a plurality of inwardly projecting elongate drive members fixed thereto and arranged, both longitudinally and circumferentially relative to the drum in such a manner as to form a set of successive portions of a substantially helical surface having a second pitch which is several times greater than the first pitch.

By virtue of this disposition, when the drum rotates, the grain-and-straw mixture moves from the front towards the rear of the drum in different ways: the grain, the dust, and small fragments of straw move essentially along the rib of the drum wall, thereby allowing the grains, possibly accompanied by dust and small pieces of straw, to pass through the perforations in the drum wall and be collecting in a collected trough situated beneath the drum, whereas the straw stalks are driven essentially along the drive members, thereby preventing the straw stalks for the most part from reaching the inside wall of the drum and also driving them in the longitudinal direction of the drum at a speed considerably greater than the speed at which the grain is driven.

Advantageously, the drive members are constituted by rods having fixing means at one end for fixing them to the inside wall of the drum, e.g. to the peripheral rib, with the shape of said rods, starting from said one end, comprising the following, in succession: a short radial segment extending towards the axis of the drum; a curved segment lying in a substantially radial plane of the drum; then a curved segment lying in a plane which is inclined relative to the axis of the drum, and terminating in a free end situated at a distance from the axis of the drum.

BRIEF DESCRIPTION OF THE DRAWINGS

Details and advantages of the invention are now described with reference to the accompanying drawings, in which:

FIG. 1 is a diagrammatic perspective view of a primary separator of grain in accordance with the invention, for a combine harvester whose main components are merely sketched-in;

DESCRIPTION OF THE PREFERRED EMBODIMENT

Figure 1:
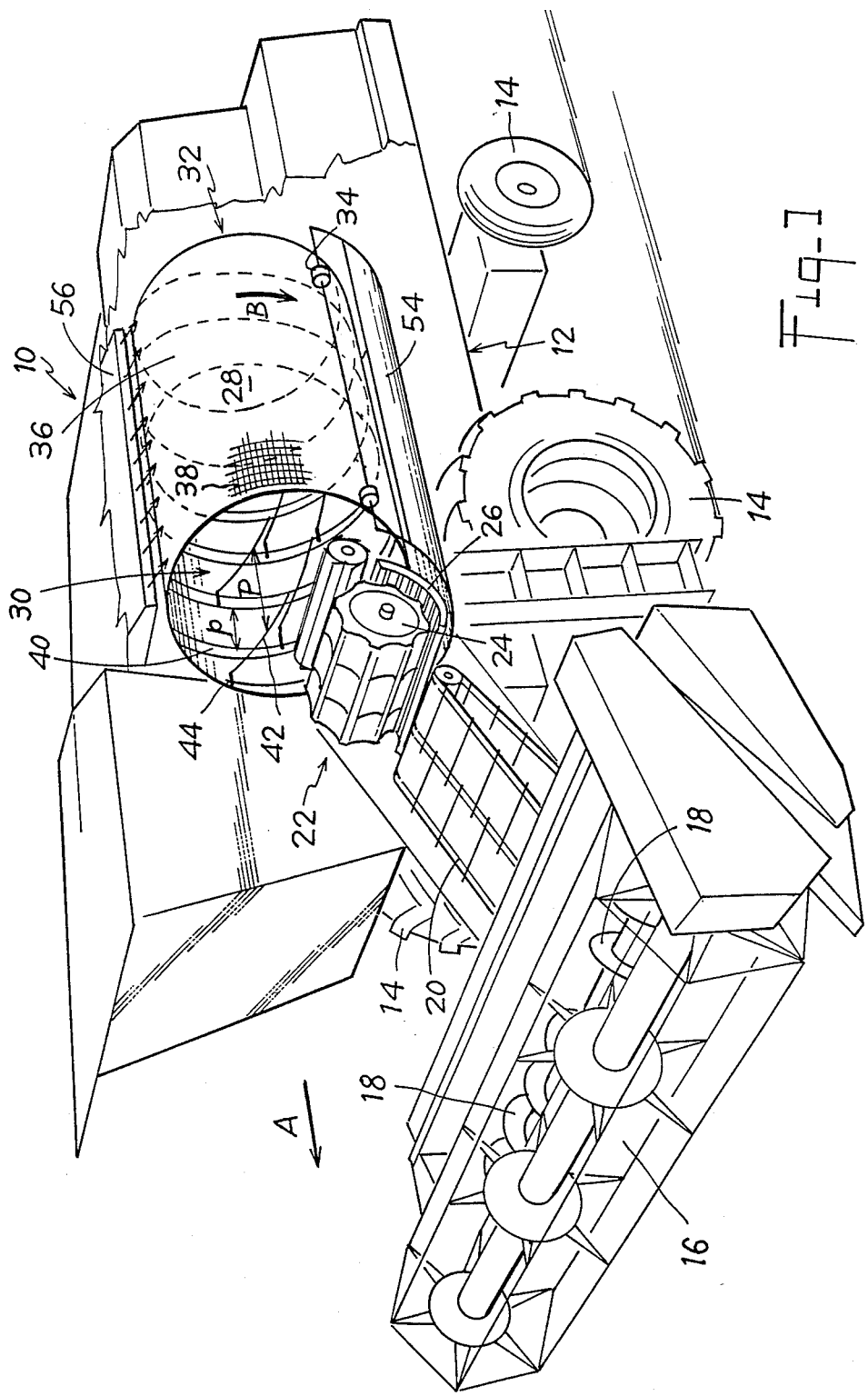

The combine harvester shown in FIG. 1 and given an overall reference 10 has a chassis 12 and wheels 14 for moving over the ground. Going from its front end towards its rear end relative to its direction of displacement in normal operation as symbolized by arrow A, the combine comprises in succession:

a mower unit 16 for cutting cereal crop stalks over a wide width and bringing them together in conventional manner into a narrower bed, e.g. by means of oppositely-handed screw conveyors 18;

a transfer conveyor 20 which raises the cereal bed from the mower unit to a height required by the following units of the machine; and a threshing stage 22 comprising a fixed backing member 26 and a threshing rotor 24 which is rapidly rotated by a motor and transmission unit (not shown), thereby constituting a conventional threshing assembly.

The harvested crop enters the rotor-and-backing member assembly and is subjected to vigorous threshing therein, essentially for the purpose of separating the grains from the stalks.

Operating conditions for this type of thresher are well known, and only a few aspects are mentioned herein:

threshing must be optimal, i.e. neither too vigorous since the cereal stalks would then be shredded and made useless, nor too gentle since the grains must be effectively separated from the stalks;

the components involved must be robust in order to withstand the major forces to which they are subjected, particularly in the event of jamming or clogging when too much harvested crop is fed to the thresher;

The threshing must be uniform, both over the entire width of the bed of harvested crop, and also over its entire thickness; and in most machines, the thresher is the member which requires most engine power, and consequently the member which gives rise to greatest fuel consumption.

In accordance with the invention, the combine harvester further comprises a primary separation drum 28 disposed longitudinally and substantially horizontally.

The drum has an inlet orifice 30 facing the outlet from the threshing stage, and an outlet orifice 32 at the rear of the combine harvester.

The drum 28 is supported by wheels 34 and is rotated in the direction of arrow B by drive means not shown. It comprises a peripheral cylindrical wall 36 pierced by multiple perforations 38 over substantially its entire area. These perforations are preferably calibrated to match the largest size of cereal grain to be harvested in the region where the combine is used. Such largest grains will normally be grains of maize (Indian corn), or else beans, or similar.

The perforations are preferably chosen to be big enough to pass ear-fragments having a few grains still adhering thereto.

Inside the drum, there is firstly a helical rib 40 fixed to the inside of the cylindrical wall 36 and extending over the entire length of the drum at a pitch p, said rib imparting adequate stiffness to the drum.

Secondly there is a plurality of elongate drive members 42 constituted in this embodiment by metal rods.

Each of these metal rods has fixing means 44 at one of its ends for fixing it to the drum, either directly to the drum wall, or else to the helical rib.

Figure 2:
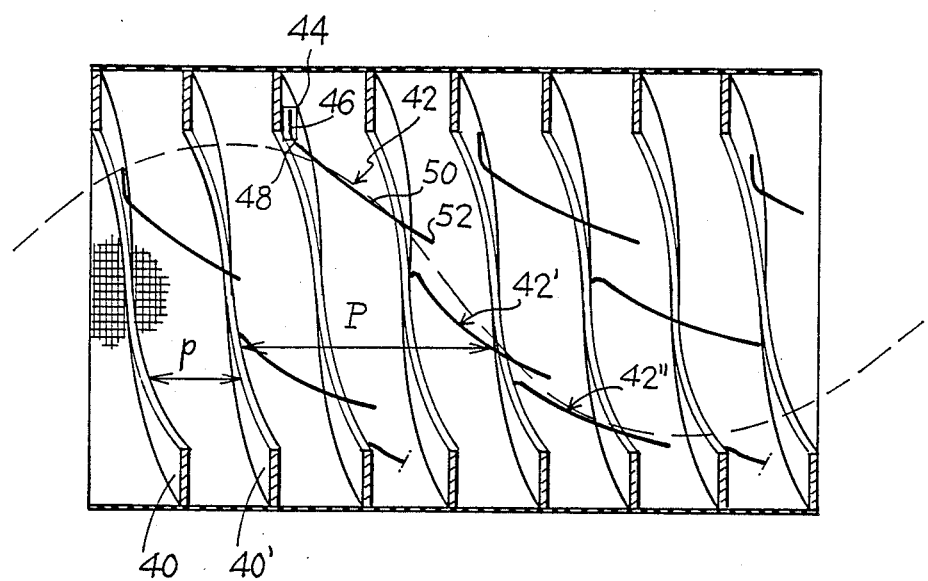
FIG. 2 is a longitudinal section through the separator drum.
Figure 3:
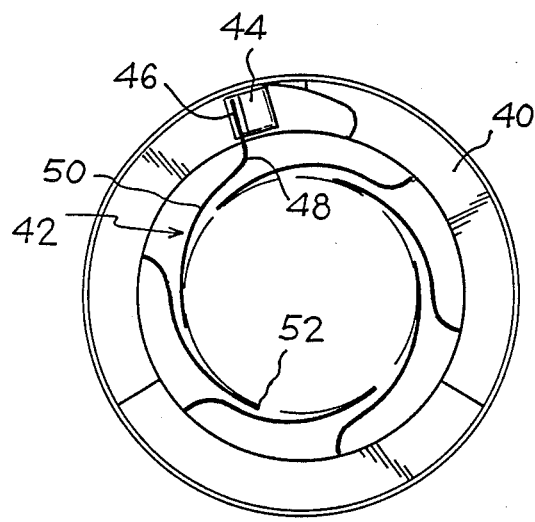
FIG. 3 is an end view of the FIG. 2 drum.

Running from said end, the rods 42 comprise, in succession, and as shown in FIGS. 2 and 3:

a short radial length 46 directed substantially towards the axis of the drum;

a curved length 48 lying in a substantially radial plane; and then a curved length 50 lying in a plane which is inclined relative to the drum axis in such a manner that the distal end 52 of the rod lies at a certain distance from the drum axis.

The metal rods are disposed successively both longitudinally and circumferentially relative to the drum so that together they form successive portions of a substantially helical surface of pitch P, where P is chosen to be considerably greater than p.

To this end, when a first rod 42 (see FIG. 2) has been put into place, a second rod 42' is disposed close to the distal end 52 of the first rod. The same procedure is followed with a third rod 42'', then with a fourth, etc.

In fact, as shown in FIG. 2, it is preferable to dispose the rib 40 and the rods 42 so as to form a plurality of interleaved helixes instead of forming single helixes of pitches p and P.

The section of FIG. 2 shows two ribs 40 and 40' offset by 180° around the circumference of the drum and separated by a longitudinal distance p, such that each of them is in fact at a pitch equal to 2p. Similarly, the rods 42 are disposed on three interleaved helixes offset by 120° from one another around the circumference of the drum and separated by a longitudinal distance P, such that each individual helix has a pitch equal to 3P. In the present case, the pitch 3P is selected to be equal to the length of the drum.

Thus, in the context of the present invention, the term "pitch" is used to designate an "equivalent" pitch should there be a plurality of interleaved helixes, with the "equivalent" pitch being equal to the pitch of any one of the helixes divided by the number of helixes.

The separator drum operates as follows:

The threshed crop, i.e. the mixture of grain and straw leaving the threshing stage 22, penetrates into the drum 28 via its inlet orifice 30. Rotation of the drum churns up the mixture allowing the grains to migrate under gravity through the straw until they come into contact with the cylindrical wall 36, and then to fall through the perforations 38, it being understood that the speed of the drum is low enough to prevent any centrifugal phenomena occurring.

Thus, the crop is raised along a rising side of the drum and then falls back after reaching a certain height towards the opposite, descending face of the drum, and thus onto an open grid surface.

During this motion, it is observed that pieces of small size: grains, dust, fragments of stalk, etc. collect together in the gaps between the peripheral ribs 40 and thus move towards the outlet orifice 32 at a speed proportional to $n \times p$ where n is the speed of rotation of the drum and p is the "pitch" of the ribs 40. The pitch p is naturally chosen to be considerably shorter than the typical length of straw stalks.

In contrast, straw stalks are guided as they fall by the rods 42 and this is easily understood since the stalks are long enough to ensure that statistically speaking they normally make contact with the rods without reaching the periphery of the drum.

Thus, to a first approximation, the stalks of straw are driven towards the outlet orifice at a speed proportional to $n \times P$, i.e. a speed which is considerably greater than the speed at which small sized pieces travel, since, statistically speaking, most of the small sized pieces do not make contact with the rods.

In addition, the stalks of straw are substantially prevented from making contact with the wall 36 of the drum by virtue of the rods 42 which hold them off at a distance therefrom. Thus, there is little risk of the stalks mixing with the small sized pieces moving along the gaps between the ribs 40, and there is little risk of the stalks obstructing the perforations 38 through the drum.

However, some stalks of straw can project beyond the rods up to the rib. It results therefrom a blocking or wedging effect on the upwardly moving side of the drum, in acute angled sectors defined between the helical rib and the helically arranged rods. Thanks to this blocking effect, the crop materials are compelled to move upwards to a relatively high level within the drum before they can fall towards the opposite downwardly moving side of the drum.

Since they fall from a significant height, these materials are effectively scattered, which allows a faster migration of the grains down to the lower portion of the drum.

Further, when falling, the stalks of straw undergo, by cooperation with the rods 42, a really efficient longitudinal drive at a speed proportional to the pitch P of the latter, and without any increase of the energy consumption.

In addition, the stalks of straw travel through the drum without being subjected to major physical stresses and they are evacuated from the rear of the combine harvester in practically the same state as on leaving the threshing stage, and they are thus reusable as bedding or food for livestock, if so desired.

As it moves through the drum, the straw has an overall density which is low, by virtue of its continual churning, and there is practically no risk of the drum clogging if fed too much straw. In addition, the structure leaves a large empty space for the straw to travel through both-between the rods themselves and also between the rods and the drum.

Together with dust, chaff, and small bits of straw, the grain collects in a collecting trough 54 extending beneath the drum.

The combine harvester naturally includes all the appropriate equipment for taking the grain from the trough and for separating it from the other matter collected therein, e.g. using blowing techniques known to the person skilled in the art.

In addition, a lip 56 may be provided close to the top of the drum for blowing air substantially radially against the outside surface of the drum so as to deblock the perforations 38, in the event that they become clogged.

Figure 4:
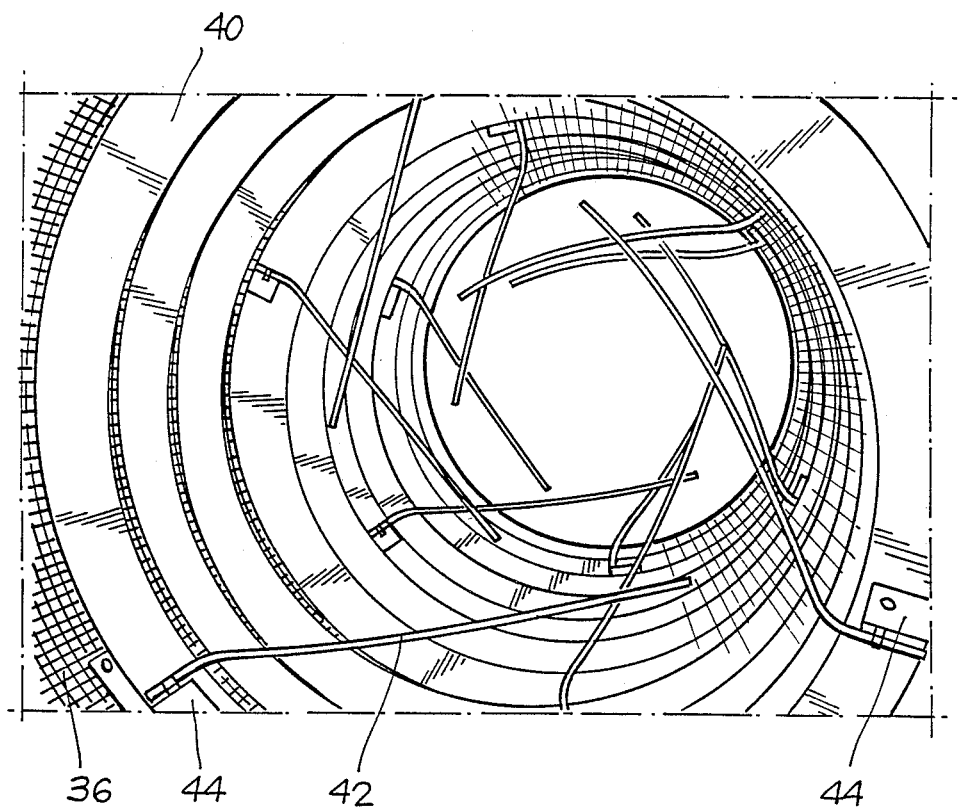
FIG. 4 is a view like a photograph looking into the drum from its inlet orifice.

A prototype drum having a diameter of 2 meters (m), and a length of 3m, built up from 9 curved perforated sheets of dimensions 2m×1m, provided with ribs having a height of 15 cm and spaced apart at 25 cm, and provided with rods having a developed length of 1.40m, shaped and disposed as illustrated in the photographic view of FIG. 4, and driven at a speed of rotation of 18 revolutions per minute (rpm) has demonstrated that the above-described operating conditions apply in practice.

Throughout the above description, the members 42 have been described as being constituted by rods, however the invention naturally covers numerous variants thereof, e.g. they could be in the form of blades, vanes, strips, etc.

Finally, in addition to reducing power consumption, the device is extremely simple and reliable.

The speed of rotation of the drum is slow and uniform and there are few or no parts in rapid or reciprocating motion.

In addition, although the description and the drawings refer to a combine harvester having a transverse thresher, it will be understood that the invention can be applied to virtually any kind of machine, including those which comprise axial-type threshers, or also the machines of the "double flow" or "natural flow" type.

What is claimed is:

1. In a combine harvester-thresher for cereals, which comprises a chassis and ground engaging wheels, the combine having a front end and a rear end, relative to its direction of travel, and further comprising, from its front end to its rear end:
    a mower for cutting cereal crop stalks over a wide width and bringing them together into a narrower bed by means of oppositely-handed screw conveyors,
    a mown crop conveyor which raises the cereal bed from the mower,
    a thresher for receiving crop from the conveyor, said thresher comprising a fixed backing member and a threshing rotor which is rotated by a motor and transmission unit, and
    a rotary grain separator comprising a cylindrical drum having an axis extending substantially horizontally and longitudinally with respect to the chassis and rotatably mounted about said axis, the drum having an inlet orifice facing said thresher and an outlet orifice opening at the rear end of the combine, the drum comprising a cylindrical wall provided with a plurality of perforations adapted for the passage of grain therethrough, and at least one internally protruding rib fixed to the cylindrical wall and forming a helix at a first predetermined pitch extending over the entire length of the drum, the improvement wherein
    said drum further comprises a plurality of inwardly projecting elongate drive members fixed thereto and arranged, both longitudinally and circumferentially relative to the drum, in such a manner as to form sets of successive portions of respective helixes having a second pitch which is several times greater than the first pitch.

2. A device as claimed in claim 1, wherein the drum includes a plurality of internal ribs forming interleaved helixes.

3. A device as claimed in claim 1, wherein the drive members are disposed in such a manner as to form a plurality of interleaved helical surfaces.

4. A device as claimed in claim 1, wherein each of said elongate drive members extends inwards and rearwards relative to the drum and has a distal end situated at a distance from the axis of the drum.

5. A device as claimed in claim 1, wherein each drive member includes fixing means at one of its ends for fixing said drive member to said rib.

6. A device as claimed in claim 1, wherein each drive member comprises a rod having
   a short radial segment affixed to the drum;
   a first curved segment lying in a plane which is substantially radial; and
   a second curved segment lying substantially in a plane which is inclined relative to the axis of the drum.

7. The invention of claim 6, wherein successive elongate members are arranged in series within said drum, with the proximal end of one elongate member in close proximity to the distal end of a neighboring elongate member, whereby each series of elongate members follows a common helical path.

8. In a rotary grain separator comprising a cylindrical drum having an axis extending substantially horizontally and longitudinally with respect to the chassis and rotatably mounted about said axis, the drum having an inlet orifice facing said thresher and an outlet orifice opening at the rear end of the combine, the drum comprising a cylindrical wall provided with a plurality of perforations adapted for the passage of grain therethrough, and at least one internally protruding rib fixed to the cylindrical wall and forming a helix at a first predetermined pitch extending over the entire length of the drum, the improvement wherein
   said drum further comprises a plurality of inwardly projecting elongate drive members fixed thereto and arranged, both longitudinally and circumferentially relative to the drum, in such a manner as to form sets of successive portions of respective helixes having a second pitch which is several times greater than the first pitch.

* * * * *